United States Patent [19]
Lauritzen et al.

[11] Patent Number: 5,464,249
[45] Date of Patent: Nov. 7, 1995

[54] GENERANT LOADED FILTER ASSEMBLY AND METHOD FOR ITS USE

[75] Inventors: Donald R. Lauritzen, Hyrum; Joseph L. Ralston, North Ogden, both of Utah

[73] Assignee: Morton International, Inc., Chicago, Ill.

[21] Appl. No.: 336,826

[22] Filed: Nov. 9, 1994

[51] Int. Cl.$^6$ ............................................. B60R 21/28
[52] U.S. Cl. ................................ 280/741; 102/531
[58] Field of Search ............................... 280/741, 736; 102/530, 531; 422/164, 165, 166

[56] References Cited

U.S. PATENT DOCUMENTS

| | | | |
|---|---|---|---|
| 3,972,545 | 8/1976 | Kirchoft et al. | 280/741 X |
| 4,277,261 | 7/1981 | Miko et al. | 102/531 X |
| 4,370,930 | 2/1983 | Strasser et al. | 102/530 |
| 4,890,860 | 1/1990 | Schaciter | 280/741 |
| 4,981,655 | 1/1991 | Kolbe et al. | 422/165 |
| 5,387,008 | 2/1995 | Lauritzen et al. | 280/741 |
| 5,387,009 | 2/1995 | Lauritzen et al. | 280/741 |
| 5,409,259 | 4/1995 | Cunningham et al. | 280/741 |

*Primary Examiner*—Margaret A. Focarino
*Assistant Examiner*—Christopher Ellis
*Attorney, Agent, or Firm*—George W. Rauchfuss, Jr.; Gerald K. White

[57] ABSTRACT

A generant-loaded filter assembly is prepared as a unitary member for subsequent insertion into the inflator chamber of an airbag module. The assembly comprises a cylindrical filter pack having end caps enclosing the gas generant, a preload, and an igniter.

7 Claims, 1 Drawing Sheet

GENERANT LOADED FILTER ASSEMBLY AND METHOD FOR ITS USE

TECHNICAL FIELD

This invention relates to the field of automotive inflatable restraint systems. More particularly, it relates to the inflator assembly which produces the gas for inflation of an automotive restraint airbag.

BACKGROUND ART

The conventional passenger-side automotive inflatable restraint system comprises a reaction canister which is a trough-like member housing a folded airbag. An inflator chamber is associated with, and may be an integral part of, the canister. Conventionally, it takes the form of a hollow cylinder which encloses a gas generator and filter combination. Ports in the inflator chamber permit gas to enter and inflate the airbag.

The inflator chamber may be in the form of a tube having two open ends. Alternatively, it may be formed with one end open, the other end being closed by a base. In either case, it is customary to load the inflator chamber on site with the necessary elements. These elements include a tubular cylindrical filter pack formed of metallic wire mesh and non-metallic fibers. The filter pack absorbs heat from the combustion gases and inhibits solid particles from exiting the inflator.

The various elements for producing the inflating gas are loaded into the inflator pack to form a filter assembly. These include the gas generant which may be, for example, in the form of cylindrical or disc-shaped grains and an igniter which may take any of several forms. A preload spring is also contained within the filter assembly to maintain the generant under compression. Suitable end caps and bases, as required, are used to complete the assembly. One major problem with this prior art approach is that the generant must be transported in bulk to the assembly lines. This can result in breakage and dusting of the generant, thereby reducing it to its most dangerous condition while present in an assembly line location where it poses danger both to persons and material.

Accordingly, it is a primary object of the present invention to provide a unitary, generant-loaded, filter assembly which may be completely assembled at the generant manufacture site and delivered to the assembly line as a drop-in component. Furthermore, this component may be inspected and certified before assembly into the inflator chamber, thereby reducing the cost associated with rejection. Other objects, features, and advantages will become apparent from the following description and appended claims.

DISCLOSURE OF INVENTION

A generant-loaded filter assembly comprises a substantially cylindrical tubular filter pack having end caps securely connected to the filter material. Intermediate the end caps are the gas generant grains and a preload for maintaining the grains under compression. The generant-loaded filter assembly may also include an igniter for activating the generant from an external signal. The generant-loaded filter assembly may be completed and shipped to the assembly site to be loaded into an inflator chamber.

BEST MODE FOR CARRYING OUT THE INVENTION

Figure 1:
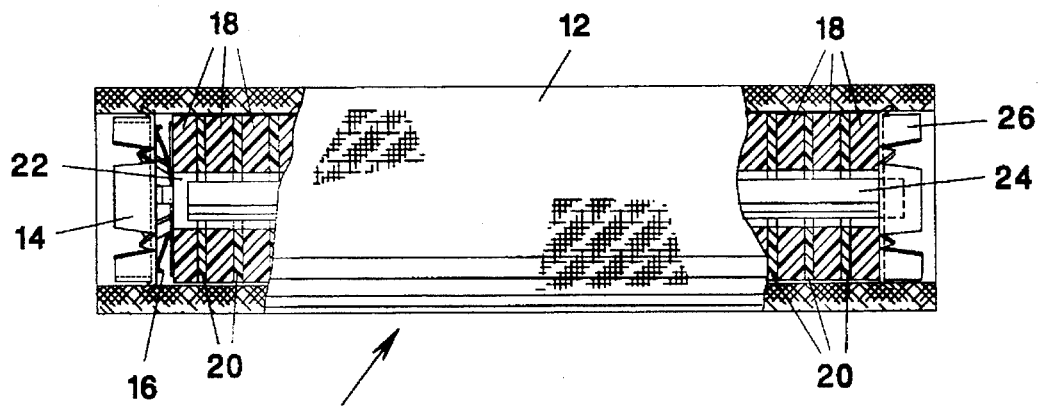
FIG. 1 is an illustration, in partial cross-section, of a generant-loaded filter assembly in accordance with the present invention.

The generant-loaded filter assembly 10 of this invention is illustrated in FIG. 1. It comprises a substantially cylindrical tubular filter pack 12 which may be made of a combination of metallic wire mesh material and non-metallic fibers. Inserted into the left end of the filter pack 12, as viewed in FIG. 1, is an end cap 14 which is a substantially circular cup shaped member having radially extending barbs which enter into the material of filter pack 12 to hold the cap in place. Such an end cap is described and illustrated in more detail in U.S. patent application Ser. No. 08/212,258 filed Mar. 14, 1994 by D. R. Lauritzen and J. L Ralston for "Generant Preload and Tolerance Takeup Assembly" and assigned to the same assignee as the present application. The disclosure of that application is incorporated by reference herein.

Adjacent to, and interconnected with, the end cap 14 is a preload spring 16 which is also described in more detail in the above-referenced patent application. Basically it is in the form of a flat washer-like member having leaf springs which engage the end cap 14.

Stacked against the preload spring 16 are a plurality of gas generant discs 18 which may be separated by washer-like separators 20. The discs 18 and separators 20 define a central passage 22 through which extends an igniter 24. It will be understood that these elements, i.e. the gas generant, the separators, the igniters, etc., may take any of a number of different forms, only one of each being illustrated for purposes of simplicity. The remaining end of the filter pack 12 is thereupon closed by an end cap 26 which may be identical to end cap 14.

During assembly of the generant-loaded filter pack 10, the last end cap 14, 26 installed is depressed firmly into position to compress the preload spring 16. It will be understood that various types of caps and preloads may be employed in this invention. Their configurations may be dictated, for example, by the igniter used to ignite the generant. Their function, however, is the same: to retain the generant and preload under compression so that the generant is prevented from moving throughout its life prior to ignition. The finger spring and washer which is employed as a preload may be assembled as illustrated or be separate elements. If separate elements, they may if desired, be interconnected by a semi-hollow rivet or other means.

Figure 2:
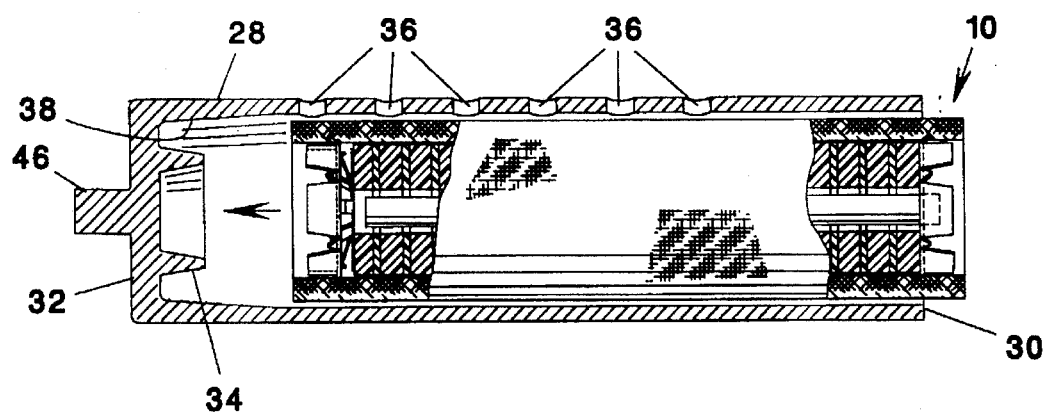
FIG. 2 illustrates the filter assembly of FIG. 1 being inserted into an inflator chamber which is illustrated in cross-section.
Figure 3:
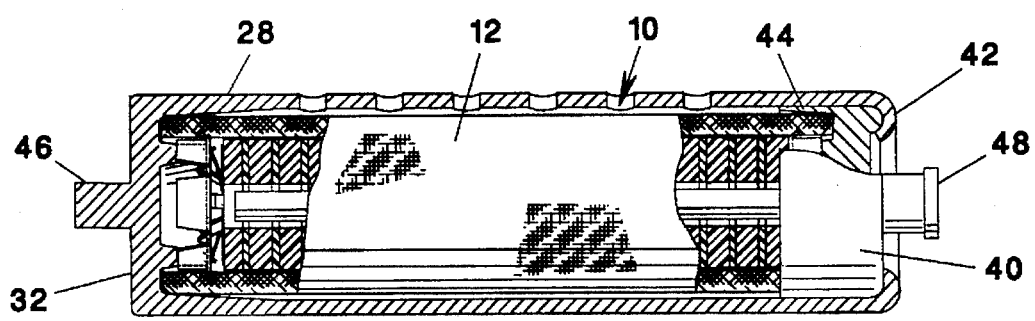
FIG. 3 is an illustration, similar to that of FIG. 2, illustrating a completed inflator chamber incorporating the generant-loaded filter assembly therein.

The generant-loaded filter assembly 10 may be manufactured and inspected and thereafter shipped to the point of assembly. FIG. 2 illustrates the generant-loaded filter assembly 10 being loaded into an inflator chamber 28. The inflator chamber 28 may be any of several types known to the prior art. The one which is illustrated has an open end 30, its other end being closed by an integral base 32 which includes a shoulder 34. The sidewall of the inflator chamber 28 includes ports 36 for venting gas outwardly into the airbag (not shown). The internal surface of the inflator chamber 28 where it meets the base 32 includes a reduced taper 38. As the filter assembly 10 is seated firmly against the base 32 as illustrated in FIG. 3, the taper compresses the ends of the filter pack 12 to thereby form a seal.

Installation of the filter assembly 10 within the inflator chamber 28 is completed by a base 40 inserted into the open end of the inflator chamber 28, the sidewall of which is then crimped 42 to retain the base 40 in position. The base 40 is also substantially cup shaped and includes a tapered rim 44 which serves the same function of compressing the end of the filter pack 12 as does the taper 38 at the other end of the inflator chamber 28. A base of this type is more fully illustrated and explained in U.S. patent application Ser. No. 08/259,852 filed Jun. 15, 1994 by D. R. Lauritzen and L. D. Rose for "End Base Assembly for Vehicle Airbag Module" and assigned to the same assignee as the present application. It will be understood that the individual elements of the generant-loaded filter assembly of this invention are conventional and are therefore not described in detail. The same is true of the elements of the completed inflator chamber such as a mounting stud 46 and an initiator 48. Accordingly, it is not believed necessary to describe these features in detail.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. The method of manufacturing an inflator for use in an automotive airbag assembly of the type including a substantially cylindrical inflator housing which comprises:

providing a substantially cylindrical filter including an open-ended sidewall formed of a mesh-like filtering material and having first and second ends;

providing first and second end caps, each being of circular, cup-like configuration and including outwardly radially extending barbs positioned around its periphery;

positioning said first end cap within the first end of said filter with its barbs extending into, and secured within, said sidewall;

providing a gas generant in the form of at least one cylindrical member having an external diameter substantially equal to the internal diameter of said sidewall;

positioning one or more gas generant cylindrical members within, to substantially fill, said sidewall;

positioning said second end cap within the second end of said filter with its barbs extending into, and secured within, said sidewall to form a unitary, generant-loaded, filter assembly;

inserting said generant-loaded filter assembly into said cylindrical inflator housing; and closing said inflator housing to retain said filter assembly therein.

2. The method of claim 1 wherein a preload member is inserted between said gas generant and at least one of said end caps.

3. A generant-loaded filter assembly for installation into an automotive airbag module which comprises:

a substantially cylindrical filter pack in the form of a hollow tube of mesh-like construction having first and second ends;

a substantially circular first end cap closing the first end of said filter and including radially extending barbs inserted into said filter pack;

a substantially circular second end cap closing the second end of said filter and including radially extending barbs inserted into said filter pack;

a gas generant enclosed within said filter pack and between said first and second end caps; and a preload member housed within said filter pack to maintain said gas generant in compression.

4. The assembly of claim 3 additionally comprising means for igniting said gas generant.

5. The assembly of claim 3 wherein said gas generant comprises a plurality of discs.

6. The assembly of claim 5 wherein said discs are separated by a plurality of separators.

7. The assembly of claim 6 additionally comprising means for igniting said gas generant.

* * * * *